(12) United States Patent
Lin et al.

(10) Patent No.: US 11,209,919 B1
(45) Date of Patent: Dec. 28, 2021

(54) KNOB DEVICE APPLICABLE TO TOUCH PANEL

(71) Applicant: HIMAX TECHNOLOGIES LIMITED, Tainan (TW)

(72) Inventors: Yu-Hsiang Lin, Tainan (TW); Chun-Jen Su, Tainan (TW); Wai-Pan Wu, Tainan (TW); Cheng-Hung Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/190,416

(22) Filed: Mar. 3, 2021

(51) Int. Cl.
*G06F 3/039* (2013.01)
*G06F 3/0362* (2013.01)
*G06F 3/044* (2006.01)
*G06F 3/041* (2006.01)
*G06F 3/038* (2013.01)

(52) U.S. Cl.
CPC ............ *G06F 3/0393* (2019.05); *G06F 3/038* (2013.01); *G06F 3/0362* (2013.01); *G06F 3/044* (2013.01); *G06F 3/0416* (2013.01)

(58) Field of Classification Search
CPC ...... G06F 3/0393; G06F 3/0362; G06F 3/038; G06F 3/0416; G06F 3/044
See application file for complete search history.

(56) References Cited

U.S. PATENT DOCUMENTS

| 10,635,201 | B2 * | 4/2020 | Ballan | .................. G06F 3/0393 |
| 2008/0110739 | A1 | 5/2008 | Peng | |
| 2020/0073487 | A1 * | 3/2020 | Ballan | ..................... G06F 3/016 |
| 2020/0073513 | A1 * | 3/2020 | Ballan | .................. G06F 3/0446 |

FOREIGN PATENT DOCUMENTS

EP    3617854 A1 *  3/2020  ........... H01H 25/065

* cited by examiner

*Primary Examiner* — Michael Pervan
(74) *Attorney, Agent, or Firm* — Winston Hsu

(57) ABSTRACT

A knob device is applicable to a touch panel. The touch panel includes a plurality of panel sensors. The knob device includes a knob cover, a sensing pad, a compensation sensor and a switch. The sensing pad is arranged between the knob cover and the touch panel. The switch is configured to selectively connect the sensing pad to the compensation sensor. When a move event of the knob device occurs, the switch is turned on and the sensing pad is electrically connected to the compensate sensor through the switch, such that a feedback loop is generated by the sensing pad, the compensation sensor and the touch panel to change a quantity of electric charge of at least one of the plurality of panel sensors. When a touch and rotation event of the knob device occurs, a location of the sensing pad controls a rotation sensing signal.

9 Claims, 6 Drawing Sheets

KNOB DEVICE APPLICABLE TO TOUCH PANEL

BACKGROUND OF THE INVENTION

1. Field of the Invention

The present invention relates to a user interface (UI) mechanism design, and more particularly, to a knob device applicable to a touch panel and capable of sensing finger touch of a user wearing gloves on his/her hands.

2. Description of the Prior Art

Knob devices are often used in general electronic apparatus, such as the knob for volume adjustment on an audio player, the knob for frequency adjustment on a radio and the knob for air conditioning/air volume adjustment on a car console, where many of these electronic apparatuses are equipped with a touch panel. Therefore, how to integrate the knob device and the touch panel to assist user in control has become an issue. In some traditional methods, the touch pad is installed in the knob and then directly mounted on the touch panel, and the function of the knob is achieved by touch effect of the touch pad on the touch panel. For example, when a user rotates the knob, a finger and the touch pad form a loop with the touch panel, such that a cell of the touch panel touched by the touch pad sends a touch signal. According to touch signals of different cells of the touch panel, the angle of rotation of the knob can be captured.

However, it is possible that a user may contact the knob when wearing gloves on his/her hands, and the touch panel may fail to sense any touch of the user. Due to such a sensing problem resulting from gloves on user's hands, the angle of rotation of the knob cannot be captured successfully. Therefore, there is a need for a novel method and associated architecture to improve a sensitivity of the touch panel for fingers with gloves for solving the problems without introducing any side effect or in a way that is less likely to introduce a side effect.

SUMMARY OF THE INVENTION

It is an objective of the present invention to provide a knob device applicable to a touch panel and capable of sensing finger touch of a user wearing gloves on his/her hands, in order to solve the above-mentioned problems.

According to one embodiment of the present invention, a knob device is applicable to a touch panel. The touch panel comprises a plurality of panel sensors. The knob device comprises a knob cover, a sensing pad, a compensation sensor and a switch. The sensing pad is arranged between the knob cover and the touch panel. The switch is configured to selectively connect the sensing pad to the compensation sensor. When a move event of the knob device occurs, the switch is turned on and the sensing pad is electrically connected to the compensate sensor through the switch, such that a feedback loop is generated by the sensing pad, the compensation sensor and the touch panel to change a quantity of electric charge of at least one of the plurality of panel sensors. When a touch and rotation event of the knob device occurs, a location of the sensing pad controls a rotation sensing signal of the touch panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
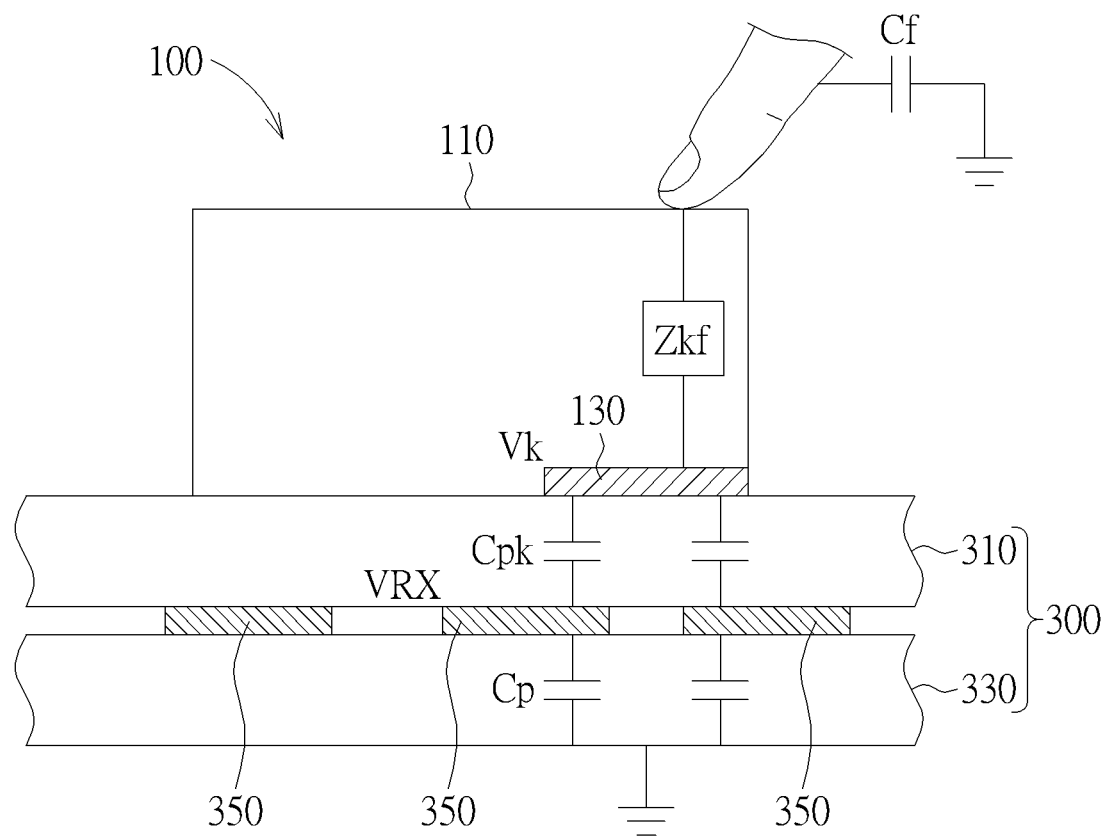
FIG. 1 is a cross-section view illustrating a knob device touched by a finger of a user without a glove on user's hand.
Figure 2:
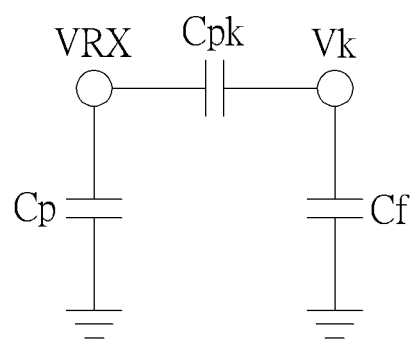
FIG. 2 is a schematic illustrating an equivalent circuit of the knob device operated under a condition shown in FIG. 1.

Please refer to FIG. 1 and FIG. 2. FIG. 1 is a cross-section view illustrating a knob device 100 touched by a finger of a user without a glove on user's hand. FIG. 2 is a schematic illustrating an equivalent circuit of the knob device 100 operated under a condition shown in FIG. 1. As shown in FIG. 1, the knob device 100 is arranged on a touch panel 300, and comprises a knob cover 110 and a sensing pad 130 arranged between the knob cover 110 and the touch panel 300. The touch panel 300 comprises a panel cover (e.g., cover glass) 310, a display panel 330 and a plurality of panel sensors 350. A display panel capacitor Cp is formed between one of the plurality of panel sensors 350 and a system ground of the touch panel 300, and a panel cover capacitor Cpk is formed between the sensing pad 130 and the panel sensor 350 (i.e., one of the plurality of panel sensors 350 that contributes to the panel cover capacitor Cpk). A finger capacitor Cf is formed between the finger of the user and the system ground of the touch panel 300. The sensing pad 130 has an electrical potential Vk, and the panel sensor 350 has an electrical potential VRX. As shown in FIG. 2, when the user touches the knob cover 110, a loop is generated by the finger capacitor Cf, the panel cover capacitor Cpk, the display panel capacitor Cp, the sensing pad 130, the panel sensor 350 and the system ground. A quantity of electric charge Qn of the panel sensor 350 is changed from Qn1 to Qn2 after the user's touch occurs, where Qn1=Cp*VRX, and Qn2=[Cp//(Cpk+Cf)] *VRX. It is noticed that the symbol of "//" means that the capacitors are connected in parallel, and the symbol of "+" means that the capacitors are connected in series. An integrated circuit (IC) of the touch panel 300 is able to generate a touching signal according to the change of Qn (ΔQn=Qn2−Qn1). In general, the finger capacitor Cf is much greater than the panel cover capacitor Cpk and the display panel capacitor Cp, such that ΔQn is approximately equal to Cpk*VRX. The impedance Zkf between the finger and the knob cover 110 is omitted in the circuit for simplicity. Since the present invention focuses on the sensing problem, further description associated with control of the knob device 100 is omitted here for simplicity.

Figure 3:
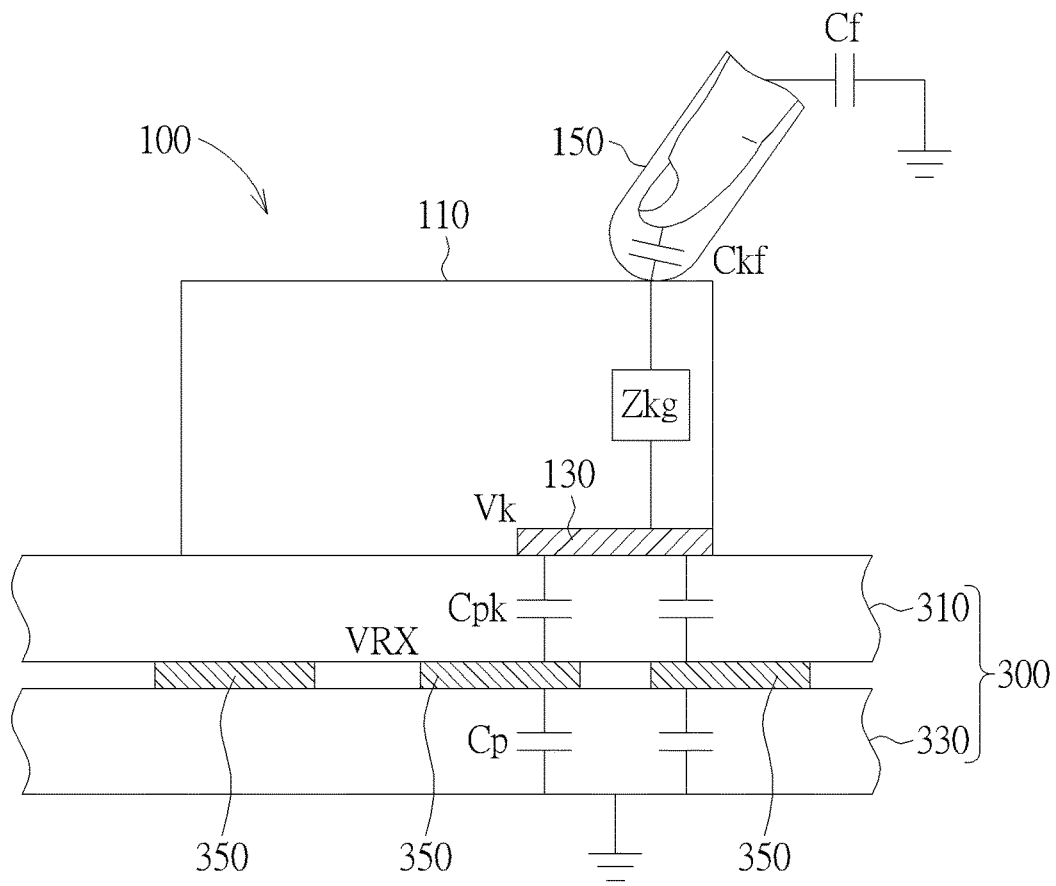
FIG. 3 is a cross-section view illustrating a knob device touched by the finger of the user with a glove on user's hand.
Figure 4:
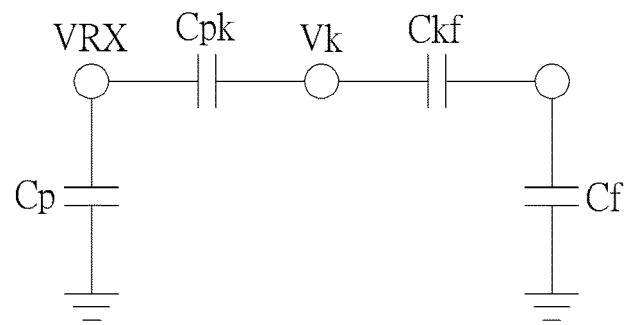
FIG. 4 is a schematic illustrating an equivalent circuit of the knob device operated under a condition shown in FIG. 3.

However, certain sensing problems may occur. For example, when the user wears gloves on his/her hands, the touch panel may not sense touch of the user. Please refer to FIG. 3 and FIG. 4. FIG. 3 is a cross-section view illustrating the knob device 100 touched by the finger of the user with a glove 150 on user's hand. FIG. 4 is a schematic illustrating an equivalent circuit of the knob device 100 operated under a condition shown in FIG. 3. As shown in FIG. 3, when a finger of a user with a glove 150 touches the knob cover 110, a glove capacitor Ckf is formed between the finger of the user and the knob cover 110. As shown in FIG. 4, the quantity of electric charge Qn of the panel sensor 350 is changed from Qn1 to Qn3 after the touch of the user with the glove 150 occurs, where Qn3=[Cp//(Cpk+Cf+Ckf)] *VRX, and Ckf<<Cpk, such that the glove capacitor Ckf dominates the total capacitance value. The change of Qn (ΔQn=Qn3−Qn1) is approximately equal to Ckf*VRX. Since the glove capacitor Ckf is relatively small, the IC of the touch panel may not be able to detect the change of Qn, which may lead to insensitivity of touch of the user with the glove 150. To address above issues, the present invention proposes providing a knob device with a compensation mechanism. Further details of the compensation mechanism are described as below.

Figure 5:
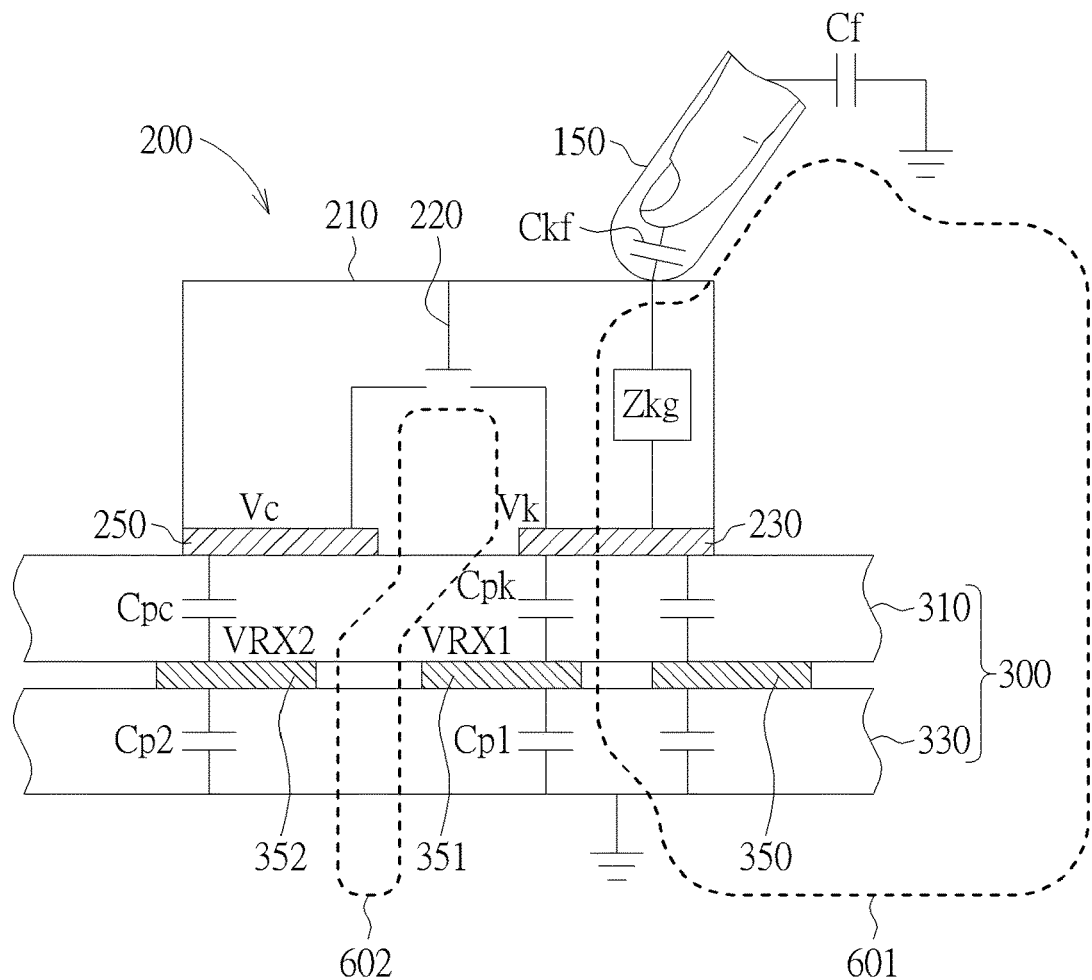
FIG. 5 is a cross-section view illustrating a knob device touched by a finger of a user with a glove on user's hand according to a first embodiment of the present invention.

Please refer to FIG. 5. FIG. 5 is a cross-section view illustrating a knob device 200 touched by a finger of a user with a glove 150 on user's hand according to a first embodiment of the present invention. As shown in FIG. 5, the knob device 200 of the present invention is arranged on a touch panel 300, and comprises a knob cover 210, a switch 220, a compensation sensor 250 and a sensing pad 230, where the sensing pad 230 is arranged between the knob cover 210 and the touch panel 300. The sensing pad 230 may move from one position to another position when the knob cover 210 is rotated by the user. The touch panel 300 comprises a panel cover (e.g., cover glass) 310, a display panel 330 and a plurality of panel sensors 350. In the present embodiment, the plurality of panel sensors 350 may comprise a first panel sensor 351 and a second panel sensor 352. A first display panel capacitor Cp1 is formed between the first panel sensor 351 and a system ground of the touch panel 300, and a first panel cover capacitor Cpk is formed between the sensing pad 230 and the first panel sensor 351. A second display panel capacitor Cp2 is formed between the second panel sensor 352 and a system ground of the touch panel 300, and a second panel cover capacitor Cpc is formed between the compensation sensor 250 and the second panel sensor 352. A finger capacitor Cf is formed between the finger of the user and the system ground of the touch panel 300. When a finger of a user with the glove 150 touches the knob cover 210, a glove capacitor Ckf is formed between the finger and the knob cover 210. The sensing pad 230 has an electrical potential Vk, and the compensation sensor 250 has an electrical potential Vc. The first panel sensor 351 has an electrical potential VRX1, and the second panel sensor 352 has an electrical potential VRX2. When the finger with the glove 150 touches the knob cover 210, a loop 601 is generated by the glove capacitor Ckf, the finger capacitor Cf, the sensing pad 230, the first panel cover capacitor Cpk, the first panel sensors 351 and the first display panel capacitor Cp1.

The switch 220 is arranged in the knob cover 210. In the present embodiment, the switch 220 is a push/pull switch. When the knob cover 210 is slightly pressed, the switch 220 is turned on for electrically connecting the sensing pad 230 to the compensate sensor 250. In addition, the switch 220 has a mechanism (e.g., a spring) that allows the knob cover 110 to be rebound up when not being pressed, such that the switch is turned off, but the present invention is not limited thereto. This mechanism can be implemented by any elastic component known to those skilled in the art, so the mechanism is not shown in figures, and further description is omitted here for simplicity. Furthermore, when a user touches and slightly presses the knob cover 210, the switch 220 is turned on and the sensing pad 230 is electrically connected to the compensate sensor 250 through the switch 220, such that a feedback loop (compensation loop) 602 is generated by the sensing pad 230, the compensation sensor 250, the first panel cover capacitor Cpk, the first panel sensors 351, the first display panel capacitor Cp1, the second panel cover capacitor Cpc, second panel sensor 352 and the second display panel capacitor Cp2, in order to change a quantity of electric charge of the first panel sensor 351. In addition, impedance Zkf between the finger and the knob cover 210 is omitted in the circuit for simplicity. In the present embodiment, the switch 220 is turned on by a slightly pressing on the knob cover 210, but the present invention is not limited thereto. In some embodiment, the switch can be turned on by slightly moving the knob cover laterally.

Figure 6:
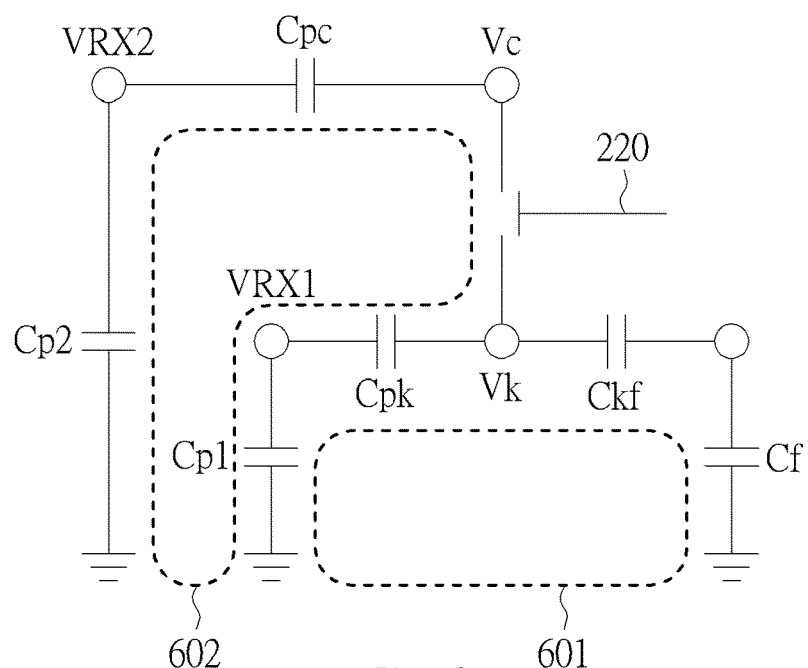
FIG. 6 is a schematic illustrating an equivalent circuit of the knob device operated under a condition shown in FIG. 5.

Please refer to FIG. 6. FIG. 6 is a schematic illustrating an equivalent circuit of the knob device 200 operated under a condition shown in FIG. 5. As shown in FIG. 6, when the finger of the user with the glove 150 touches the knob cover 210, the loop 601 is generated. The loop 601 is similar to the equivalent circuit in FIG. 4, so that the change of a quantity of electric charge Qn of the first panel sensor 351 in the loop 601 is small due to the fact that the glove capacitor Ckf is relatively small. When the finger of the user with the glove 150 touches and slightly presses the knob cover 210, the loop 601 and the feedback loop 602 are both generated. The quantity of electric charge Qn of the first panel sensor 351 is changed from Qn1 to Qn2 after the user's touching and pressing, where Qn1=Cp1*VRX1; Qn2=[Cp1//(Cpk+{(Cf+Ckf)//(Cpc+Cp2)}] *VRX. It is noticed that the symbol of "//" means that the capacitors are connected in parallel, and the symbol of "+" means that the capacitors are connected in series. An integrated circuit (IC) of the touch panel 300 is able to generate a touching signal according to the change of Qn (ΔQn=Qn2−Qn1), and a rotation sensing signal is further generated according to the touching signal. In other words, when the user touches and rotates the knob device 200, the panel sensor under the sensing pad 230 (e.g., the first panel sensor 351) obtains a change of the quantity of electric charge, such that a location of the sensing pad 230 controls a rotation sensing signal of the touch panel 300. It is noticed that the feedback loop 602 changes the Qn2 from [Cp1//(Cpk+Cf+Ckf)] *VRX to [Cp1//(Cpk+{(Cf+Ckf)//(Cpc+Cp2)}] *VRX, such that the small glove capacitor Ckf only dominates the series capacitors (Cpk+{(Cf+Ckf). The change of Qn (ΔQn) can be increased by connecting the series capacitors (Cpc+Cp2) in parallel.

In some embodiments, the knob cover 210 may be made of metal with excellent conductivity, such that the capacitance value of the glove capacitor Ckf can be increased by enhancing the coupling capability of the knob cover 210. However, this is for illustrative purposes only, and is not meant to be a limitation of the present invention.

According to the above arrangements, when the finger of the user with a glove is not able to create enough change of the quantity of electric charge, the feedback loop enabled by the turned-on switch creates the connection of series capacitors (Cpc+Cp2) in parallel, in order to create greater difference of the quantity of electric charge. In addition, the greater capacitance values the second panel cover capacitor Cpc and the second display panel capacitor Cp2 have, the greater difference of the quantity of electric charge can be made, such that the knob device 200 has a better Signal-to-noise ratio (SNR) to the panel sensor 300, and the finger of the user with a glove can be more recognizable by the knob device 200.

In some embodiments, the second panel sensor 352 can be controlled by an integrated circuit (IC) channel of the touch panel 300 to provide a different electrical potential level from other panel sensors 350, in order to increase the capacitance values of the second panel cover capacitor Cpc and the second display panel capacitor Cp2. However, this is for illustrative purposes only, and is not meant to be a limitation of the present invention.

Figure 7:
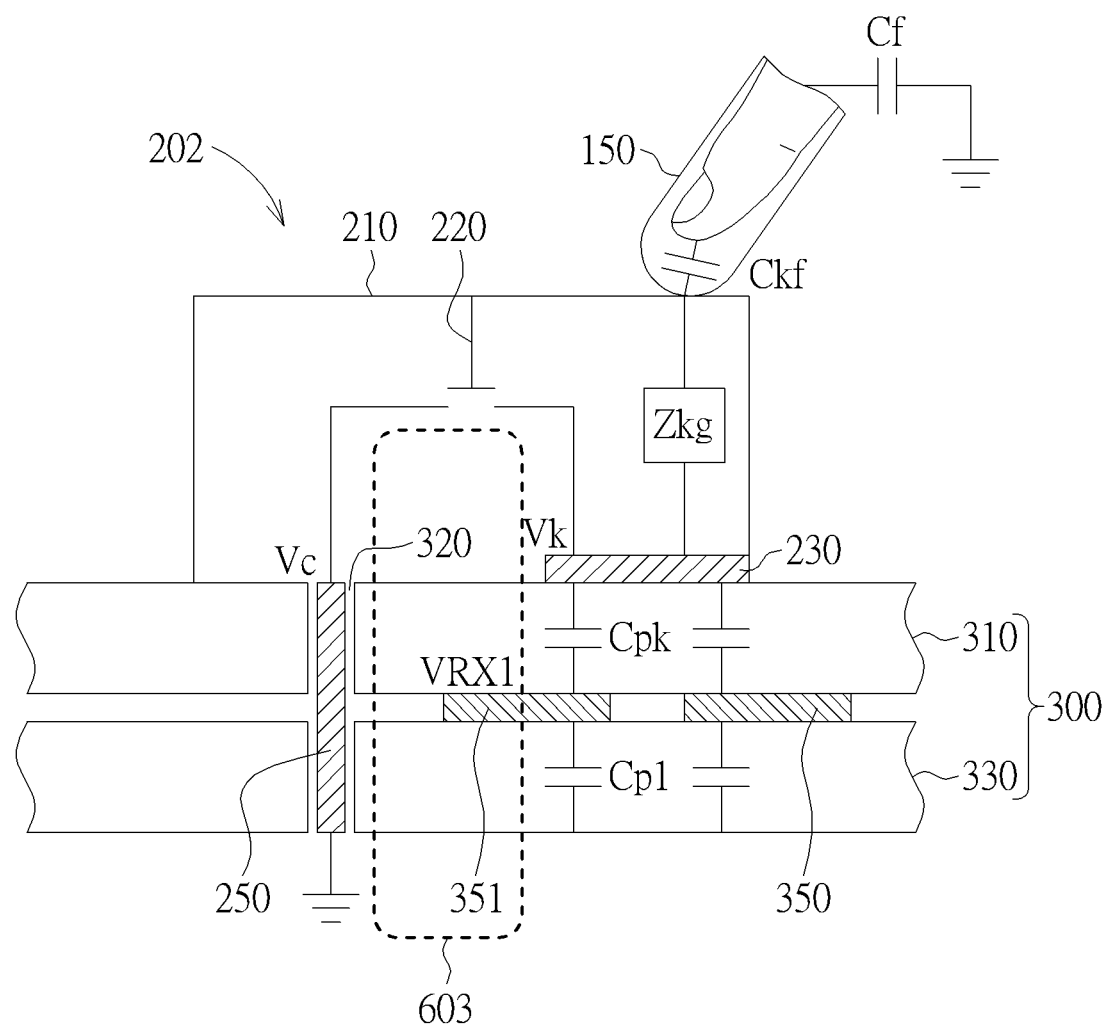
FIG. 7 is a cross-section view illustrating a knob device touched by the finger of the user with a glove on user's hand according to a second embodiment of the present invention.

Please refer to FIG. 7. FIG. 7 is a cross-section view illustrating a knob device 202 touched by the finger of the user with a glove 150 on user's hand according to a second embodiment of the present invention. As shown in FIG. 7, the difference between the second embodiment and the first embodiment is that a through hole 320 is formed in the touch panel 300, and the compensation sensor 250 is arranged in the through hole 320 and electrically connected to a system ground of the touch panel 300. When the finger of the user with the glove 150 touches and slightly presses the knob device 202, the switch 220 is turned on and a feedback loop 603 is generated by the sensing pad 230, the compensation sensor 250, the first panel sensor 351, the first panel cover capacitor Cpk, the first display panel capacitor Cp1 and the system ground. In the present embodiment, the compensation sensor 250 has one end directly connected to the system ground, so that the electrical potential Vc of the compensation sensor 250 is approximately zero, which is equivalent to assigning infinite capacitance values to the second panel cover capacitor Cpc and the second display panel capacitor Cp2 in FIG. 6. Hence, compared to the first embodiment, the second embodiment can increase the change of the quantity of electric charge Qn of the first panel sensor 351 (ΔQn), and can make the first panel sensor 351 of the knob device 202 have a better SNR. In the present embodiment, the switch 220 is turned on by a slightly pressing on the knob cover 210, but the present invention is not limited thereto. In some embodiment, the switch can be turned on by slightly moving the knob cover laterally.

Figure 8:
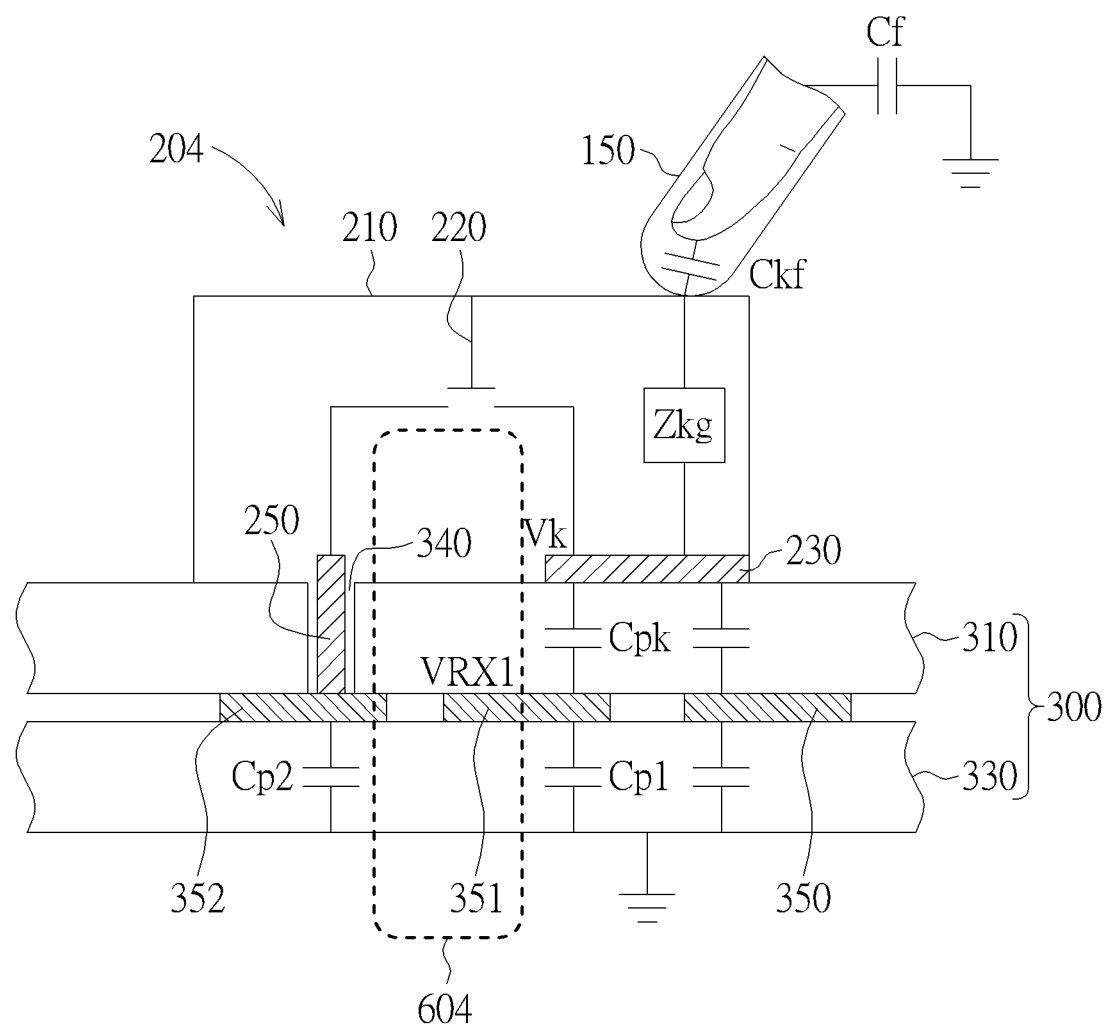
FIG. 8 is a cross-section view illustrating a knob device touched by the finger of the user with a glove on user's hand according to a third embodiment of the present invention.

Please refer to FIG. 8. FIG. 8 is a cross-section view illustrating a knob device 204 touched by the finger of the user with a glove 150 on user's hand according to a third embodiment of the present invention. As shown in FIG. 8, the difference between the third embodiment and the first embodiment is that a blind hole 340 is formed in the panel cover 310. The compensation sensor 250 is arranged in the blind hole 340 and electrically connected to the second panel sensor 352. When the finger of the user with the glove 150 touches and slightly presses the knob device 204, the switch 220 is turned on and the feedback loop 604 is generated by the sensing pad 230, the compensation sensor 250, the first panel sensor 351, the second panel sensor 352, the first panel cover capacitor Cpk, the first display panel capacitor Cp1, the second display panel capacitor Cp2 and the system ground. In the present embodiment, the compensation sensor 250 has one end directly connected to the second panel sensor 352. The second panel sensor 352 can be controlled by the IC channel of the touch panel 300 to provide a different electrical potential level from other panel sensors 350, in order to increase the capacitance values of the second panel cover capacitor Cpc and the second display panel capacitor Cp2. For example, the second panel sensor 352 is driven to be a ground (0V) by a drive signal, so that the electrical potential Vc of the compensation sensor 250 is zero, which is equivalent to assigning an infinite capacitance value to the second panel cover capacitor Cpc in FIG. 6. In other words, through the connection of the compensation sensor 250 and the second panel sensor 352, the electrical potential level of the second panel sensor 352 is able to be changed by the IC channel of the touch panel 300 to increase the change of the quantity of electric charge Qn of the first panel sensor 351 (ΔQn). In the present embodiment, the switch 220 is turned on by a slightly pressing on the knob cover 210, but the present invention is not limited thereto. In some embodiment, the switch can be turned on by slightly moving the knob cover laterally.

Figure 9:
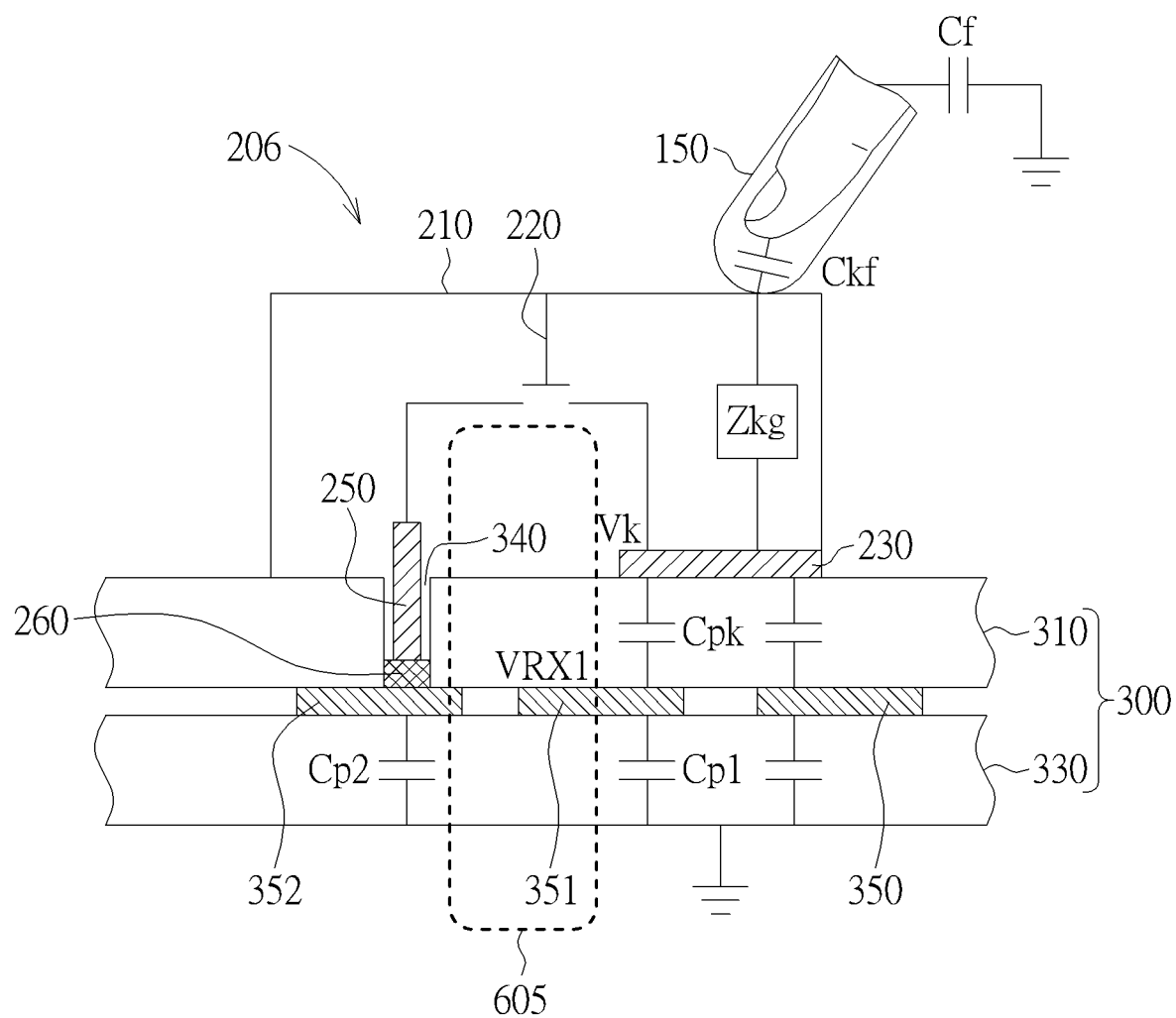
FIG. 9 is a cross-section view illustrating a knob device with a protecting layer according to a fourth embodiment of the present invention.

Please refer to FIG. 9. FIG. 9 is a cross-section view illustrating a knob device 206 with a protecting layer 260 according to a fourth embodiment of the present invention. As shown in FIG. 9, the difference between the fourth embodiment and the third embodiment is that a protecting layer 260 is arranged between the compensation sensor 250 and the second panel sensor 352, such that the compensation sensor 250 is not directly connected to the second panel sensor 352, that is, the compensation sensor 250 is coupled to the second panel sensor 352 via the protecting layer 260. A protecting layer capacitor (not shown in FIG. 9) is formed between the compensation sensor 250 and the second panel sensor 352. When the finger of the user with the glove 150 touches and slightly presses the knob device 206, the switch 220 is turned on and the feedback loop 606 is generated by the sensing pad 230, the compensation sensor 250, the first panel sensor 351, the second panel sensor 352, the first panel cover capacitor Cpk, the first display panel capacitor Cp1, the second display panel capacitor Cp2, the protecting layer capacitor and the system ground. Since the protecting layer is thinner than the panel cover 310, the protecting layer capacitor is similar to the second panel cover capacitor Cpc in FIG. 6, but has a greater capacitance value. Therefore, the protecting layer capacitor is able to create greater difference of the quantity of electric charge than the second panel cover capacitor Cpc. In the present embodiment, the switch 220 is turned on by a slightly pressing on the knob cover 210, but the present invention is not limited thereto. In some embodiment, the switch can be turned on by slightly moving the knob cover laterally. In addition, the second panel sensor 352 can also be controlled by the IC channel of the touch panel 300 to provide a different electrical potential level from other panel sensors 350, in order to increase the capacitance values of the protecting layer capacitor and the second display panel capacitor Cp2, to further improve the SNR of the knob device to the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A knob device, applicable to a touch panel, the touch panel comprising a plurality of panel sensors, the knob device comprising:
    a knob cover;

a sensing pad, arranged between the knob cover and the touch panel;

a compensation sensor; and a switch, configured to selectively connect the sensing pad to the compensation sensor;

wherein when a move event of the knob device occurs, the switch is turned on and the sensing pad is electrically connected to the compensation sensor through the switch, such that a feedback loop is generated by the sensing pad, the compensation sensor and the touch panel to change a quantity of electric charge of at least one of the plurality of panel sensors;

wherein when a touch and rotation event of the knob device occurs, a location of the sensing pad controls a rotation sensing signal of the touch panel.

2. The knob device of claim 1, wherein the touch panel further comprises a panel cover and a display panel, the plurality of panel sensors are arranged between the panel cover and the display panel, a panel cover capacitor is formed between the sensing pad and one panel sensor, another panel cover capacitor is formed between the compensation sensor and another panel sensor, a display panel capacitor is formed between the one panel sensor and a system ground of the touch panel, another display panel capacitor is formed between the another panel sensor and the system ground, and when the move event of the knob device occurs, the switch is turned on and the feedback loop is generated by the sensing pad, the compensation sensor, the two panel sensors, the two panel cover capacitors, the two display panel capacitors and the system ground.

3. The knob device of claim 2, wherein the another panel sensor which is under the compensation sensor is controlled by an integrated circuit (IC) channel of the touch panel to provide a different electrical potential level from other panel sensors.

4. The knob device of claim 1, wherein a through hole is formed in the touch panel, the compensation sensor is arranged in the through hole and electrically connected to a system ground of the touch panel, a panel cover capacitor is formed between the sensing pad and one panel sensor, a display panel capacitor is formed between the one panel sensor and a system ground, when the move event of the knob device is occurs, the switch is turned on and the feedback loop is generated by the sensing pad, the compensation sensor, the one panel sensor, the panel cover capacitor, the display panel capacitor and the system ground.

5. The knob device of claim 1, wherein a blind hole is formed in the panel cover, the compensation sensor is arranged in the blind hole and electrically connected to one panel sensor, a panel cover capacitor is formed between the sensing pad and another panel sensor, a display panel capacitor is formed between the one panel sensor and a system ground of the touch panel, another display panel capacitor is formed between the another panel sensor and the system ground, and when the move event of the knob device occurs, the switch is turned on and the feedback loop is generated by the sensing pad, the compensation sensor, the two panel sensors, the panel cover capacitor, the two display panel capacitors and the system ground.

6. The knob device of claim 5, wherein the panel sensor which is electrically connected to the compensation sensor is controlled by an integrated circuit (IC) channel of the touch panel to provide a different electrical potential level from other panel sensors.

7. The knob device of claim 6, further comprising:

a protecting layer, arranged between the compensation sensor and the panel sensor.

8. The knob device of claim 1, wherein the knob cover is made of metal.

9. The knob device of claim 1, wherein a portion of the knob cover is made of metal.

* * * * *